(12) United States Patent
Stringam et al.

(10) Patent No.: US 6,427,718 B1
(45) Date of Patent: Aug. 6, 2002

(54) AUTOMATED FARM TURNOUT

(75) Inventors: Blair Lewis Stringam; Clifford Alan Pugh, both of Littleton, CO (US)

(73) Assignee: The United States of America as represented by the Secretary of the Interior, Washington, DC (US)

( * ) Notice: Subject to any disclaimer, the term of this patent is extended or adjusted under 35 U.S.C. 154(b) by 0 days.

(21) Appl. No.: 09/729,713

(22) Filed: Dec. 6, 2000

(51) Int. Cl.[7] .................. E03B 7/28; F16K 31/12; F17D 3/01
(52) U.S. Cl. .................. 137/392; 405/92; 700/32; 700/41; 700/54; 700/281; 700/282; 137/487.5
(58) Field of Search .................. 137/392, 487.5, 137/558; 340/517, 524, 525, 606, 620; 405/87, 92, 96, 37, 39; 700/281, 282, 283, 284, 32, 41, 44, 45, 46, 54

(56) References Cited

U.S. PATENT DOCUMENTS

| | | | | |
|---|---|---|---|---|
| 2,059,635 A | * | 11/1936 | Fillo | 137/392 |
| 2,330,290 A | * | 9/1943 | King | 137/392 |
| 3,077,203 A | * | 2/1963 | Wolsh | 137/392 |
| 4,036,023 A | * | 7/1977 | Matsumoto et al. | 405/92 |
| 4,332,507 A | * | 6/1982 | Wakamori et al. | 405/92 |
| 4,498,809 A | * | 2/1985 | Farmer | 405/92 |
| 4,604,681 A | * | 8/1986 | Sakashita | 405/92 |
| 4,624,280 A | * | 11/1986 | DePirro | 137/392 |
| 5,372,456 A | * | 12/1994 | Langemann | 405/92 |
| 5,992,443 A | * | 11/1999 | Rodriguez | 137/392 |

FOREIGN PATENT DOCUMENTS

| | | | | |
|---|---|---|---|---|
| GB | 2187573 | * | 9/1987 | 137/392 |
| JP | 0226808 | * | 10/1991 | 137/392 |
| JP | 4104307 | * | 4/1992 | 137/392 |
| JP | 5289752 | * | 11/1993 | 137/392 |
| JP | 6324743 | * | 11/1994 | 137/392 |

* cited by examiner

Primary Examiner—George L. Walton
(74) Attorney, Agent, or Firm—Ross F. Hunt, Jr.

(57) ABSTRACT

An automated turnout system is provided for controlling water flow through a turnout gate. The system determines the water flow parameters of the open channel and adjusts the size of the gate opening accordingly. The turnout system includes a flow measurement structure such as weir or flume, a water level sensor for measuring the water level at the flow measurement structure, a flow control gate, an actuator for adjusting the gate and a position sensor for determining the gate setting. A controller determines the proper gate setting based on inputs from the water level sensor and position sensor. The system provides a low cost, practical way to control outflow under varying canal water levels so as to improve irrigation operations.

12 Claims, 1 Drawing Sheet

AUTOMATED FARM TURNOUT

FIELD OF THE INVENTION

The present invention relates to a system for controlling water flow in through open irrigation channels or canals. More particularly, the present invention relates to an automated turnout system for automatically controlling water flow from a main channel.

BACKGROUND OF THE INVENTION

Open channels are subject to water level fluctuations, which cause water flow to feeder irrigation channels to fluctuate. These fluctuations can cause damage to crops and can waste water. Farmers and irrigation ditch operators have used control gate devices referred to as turnouts to control the flow of water from open channels. These turnouts were not automated and require human operators. These operators have to determine the required flow rate and then set the gate device to the required position. As the main canal or channel and lateral canals or channels fluctuate because of flow changes in the main canal, individual turnouts are subjected to fluctuations because no compensation adjustment is made at the individual turnout. However, the cost of providing a regulation mechanism for each turnout is prohibitively expensive. In this regard, the cost of the gate operator alone is more than farmers can practically afford.

SUMMARY OF THE INVENTION

According to the invention, an automated turnout system is provided which can be used to maintain a constant outflow through a farm turnout gate and to help manage water deliveries in open channel systems. The system improves the consistency and dependability of farm deliveries. In addition, the flexibility of the main canal operations is improved because the requirement for constant water levels throughout the canal system is removed and more water is thus available. Because the water is managed better, crops can receive the required amount of water. Further, the flow delivered to the main canal and to the farmers is much closer to that actually required.

In accordance with the invention, an automated turnout control system is provided for controlling the flow of water from a main channel to a turnout channel, the system comprising: a flow measurement structure located in the turnout channel; a water level sensor for measuring the water level at the flow measurement structure and for producing a corresponding output signal; an adjustable flow control gate for controlling the flow of water into the turnout channel from the main channel; a gate actuator for adjusting the gate to an adjusted setting so as to control the flow of water therethrough; a gate setting sensing means for sensing the adjusted setting and for producing a corresponding output signal; and a controller, connected to the water level sensor, gate setting sensing means and gate actuator, for receiving said output signals from the water level sensor and gate setting sensing means and for controlling the gate actuator to adjust the gate setting based on these output signals.

Preferably, the flow control gate comprises a movable gate member movable to a plurality of flow control positions including a fully open position wherein maximum flow is provided and a fully closed position wherein flow is restricted. The gate setting sensing means preferably comprises a position sensor for sensing the position of said movable gate member. Advantageously, the gate comprises a slide gate and the movable gate member comprises a vertically movable gate leaf. The gate actuator preferably comprises a linear actuator for raising and lowering the gate leaf of the slide gate.

The controller preferably comprises a central processing unit. The central processing unit advantageously uses a proportional integral algorithm in controlling said gate actuator. More particularly, the central processing unit advantageously uses a closed loop control algorithm.

The flow measurement structure is located downstream of said flow control gate whereas the water level sensor is located upstream of said flow measurement structure and downstream of the adjustable flow control gate.

In one preferred implementation, the water level sensor comprises an ultrasonic sensor and the flow measurement structure comprises a weir or flume. In another, the flow measurement structure comprises a stilling well and the water level sensor comprises a stilling well mounted string transducer.

Further features and advantages of the present invention will be set forth in, or apparent from, the detailed description of preferred embodiments thereof which follows.

DESCRIPTION OF THE PREFERRED EMBODIMENTS

Figure 1:
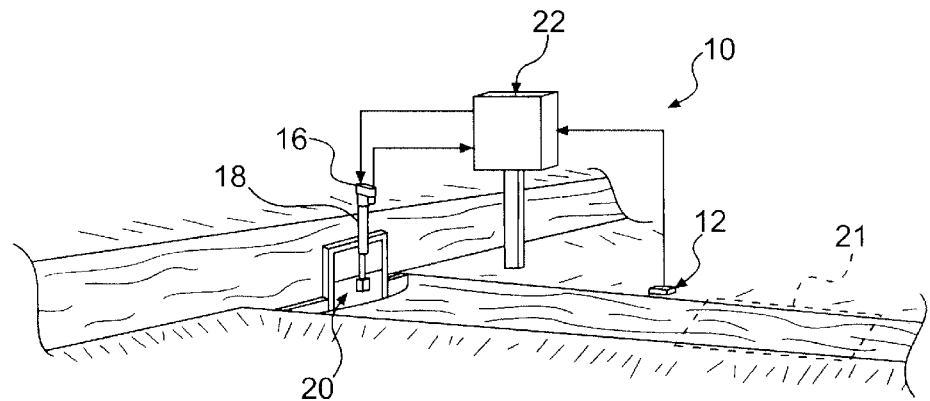
FIG. 1 is a perspective view of a preferred embodiment of the automated turnout system of the invention, showing the system in use.
Figure 2:
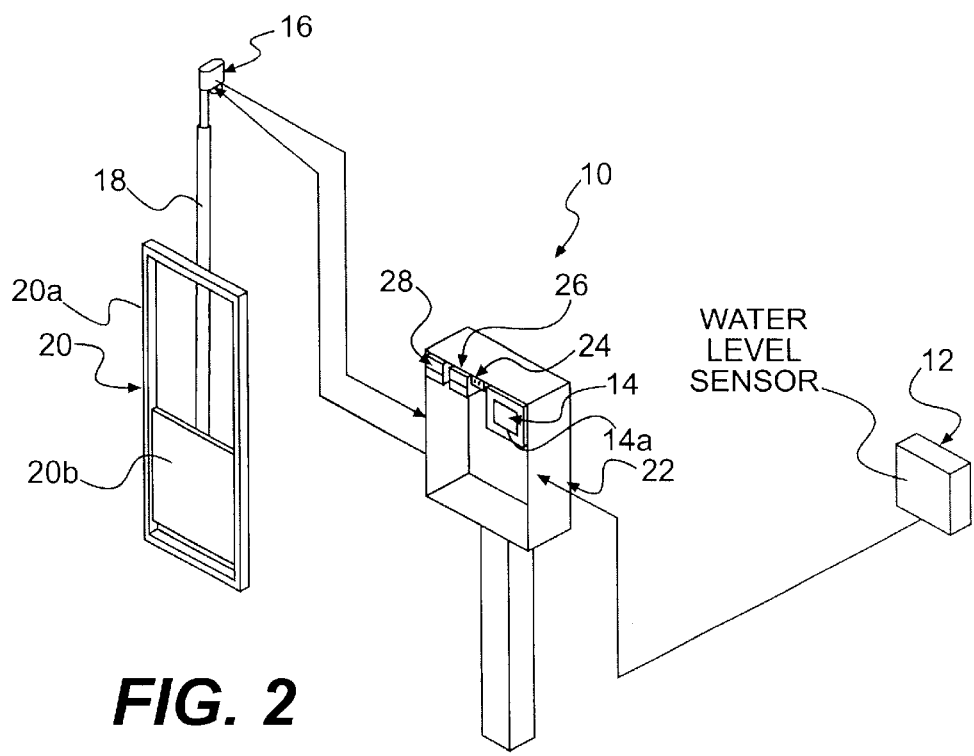
FIG. 2 is a further perspective view of the preferred embodiment of the invention showing in more detail the basic components thereof.

Referring to FIGS. 1 and 2, there is shown an automated farm turnout system in accordance with a preferred embodiment of the invention. The system, which is generally denoted 10, includes the following basic components or units: a water level sensor 12, a central processing unit (CPU) 14 (see FIG. 2) housed in a control box 22, a gate position sensor 16, a gate actuator 18, a turnout gate 20 and a flow measurement structure or device 21. The CPU 14 functions as a controller for the overall system.

In general, the water level sensor 12, the CPU 14, and the gate position sensor 16 cooperate to measure the water level and gate position, and through control of the gate actuator 18, to make appropriate adjustments to the position of the gate 20. As shown in FIG. 1, the system 10 can be used in environments such as that illustrated, including a canal C and a turnout T which is fed from the Canal C and which includes the measurement structure 21 such as ramp flume. In general, the water level sensor 12 is positioned upstream relative to the measurement structure 21 (e.g., a flume or weir) so as to measure the open channel head, and the output of the water-level sensor 12 is connected to the CPU 14 so that a signal related to the measurement structure water level is supplied to the CPU 14.

The gate position sensor 16 is positioned relative to the gate 20 so as to measure the gate position. The output of the gate position sensor 16 is also connected to the CPU 14 as described in more detail below. The CPU 14 uses measurements from the water-level sensor 12 and the gate position sensor 16 to determine the appropriate position of the gate 20. The CPU 14 transmits a corresponding output to the actuator 18 which adjusts the gate 20.

In the exemplary embodiment shown in FIG. 1, the water level sensor 12 is located downstream of the gate 20 and associated gate position sensor 16 adjacent to and upstream of the measurement structure 21. A stilling well can also be used as the measurement structure 21 and in this case, the water level sensor 12 can comprise a stilling well mounted string transducer or other water level sensor. If a stilling well is not to be installed, a submersible pressure transducer or an ultrasonic level sensor can also be used. In general, the basic requirement for the water level sensor 16 is that the sensor output signal be compatible with controller analog inputs.

As indicated above, the CPU 14 is housed in control box 22 which, as shown in FIG. 2, also houses other electrical components, such as a control switch 24, a standard relays 26, and two solid-state relays 28. The relays 26 and 28 permit the CPU 14 to raise and lower the gate 20 while the control switch 24 enables an operator to manually move the gate. The CPU 14 includes a display screen 14a which can be read through a window (not shown) in control box 22. In a preferred embodiment, pushbutton switches (not shown) are located on CPU 14 which enable ready changing of the desired flow set point, resetting the total water delivered, and resetting the controller (CPU) 14 if an error occurs. The control box 22 also includes a power source in the form of a battery pack (not shown) and/or a solar panel (not shown) to provide power for CPU 14, although other, different power sources can be used.

Gate 20 includes an upright frame 20a in which a gate leaf 20b is slidable under the control of actuator 18. Gate 20 is preferably a simple, economical turnout gate of a conventional type using a manual crank or operator arm and the gate is simply retrofitted with the linear actuator 18. The operator arm (not shown) is preferably retained because it provides a visual indication that the gate leaf 20b is moving and also can be used in emergency situations should the actuator 18 fail.

The actuator 18 is a linear actuator which is preferably of a conventional type such as those used in providing movement of a satellite disk. The linear actuator 18 preferably comprises a motor (not shown) which drives a threaded rod (not shown) received in a nut assembly (not shown) associated with gate leaf 20b. Rotation of the threaded rod of the linear actuator 18, under the control of signals supplied to the drive motor of actuator 18 from the CPU 14, provides raising and lowering of the gate leaf 20b.

An important feature of the invention is that the controller (CPU) 14 can be a very low cost unit that can be simply programmed in BASIC computer language. In a preferred embodiment, a Proportional-Integral (PI) control algorithm is used by the CPU 14 to determine the flow rate of water through the open channel or weir, estimate the desired gate position, compare the desired gate position with the present gate position and adjust the gate position accordingly, using a closed loop (PI) control routine. The flow rate is determined using known equations to convert the water level signal from sensor 12 into a corresponding flow rate, and different known equations are used depending on whether a weir or flume is used as measuring structure 21. The CPU 14 adjusts gate position by supplying an appropriate gate position adjustment signal to the linear actuator 18 which, responsive thereto, raises or lowers the gate leaf 20b of gate 20. After each control action, the CPU 14 obtains a new input from the water level sensor 12 and the gate position sensor 16 and repeats the procedure if required. The CPU 14 also computes the total amount of water delivered based on the flow rate signal and displays this value along with the current flow rate on display screen 14a.

In the preferred embodiment described above, the invention is used to control outflow from a canal C to a single farm turnout T. As discussed previously, in the past, such systems have not been feasible due to the high cost and complexity of the systems. The low cost and simplicity of the system of the present invention make it practical for many situations where constant outflows are desired. This ability to control outflow under varying canal water levels will improve irrigation operations and reduce administrative spill. As indicated above, the saved water can be used for additional irrigation or other competing uses such as in-stream flows to improve riparian habitat.

It will be appreciated that the system of the invention has several advantages over the prior art device mentioned above. First, the system can constantly measure turnout adjustments to maintain a near constant flow rate. The system will also deliver the desired amount of water (not too much or too little water), thereby conserving water. As the proper amount of water is delivered to a farm turnout the farmer will be able to apply the right amount of water which will result in the most optimum crop production considering all of the input costs. The total amount of water that is delivered can be recorded so that the farmer and canal operators can better manage and account for the delivered water.

Although the invention has been described above in relation to preferred embodiments thereof, it will be understood by those skilled in the art that variations and modifications can be effected in these preferred embodiments without departing from the scope and spirit of the invention.

What is claimed is:

1. An automated turnout control system for controlling the flow of water from a main channel to a turnout channel of a farm, said system comprising:

a flow measurement structure located in the turnout channel of the farm downstream of the main channel;

a water level sensor for measuring the water level at said flow measurement structure and for producing a corresponding output signal;

an adjustable flow control gate located in the turnout channel upstream of said measurement structure and said water level sensor for controlling the rate of flow of water into said turnout channel from said main channel;

a gate actuator for adjusting said flow control gate to an adjusted setting so as to control the rate of flow of water therethrough;

a gate setting sensing means for sensing the adjusted setting and for producing a corresponding output signal; and a controller, connected to said water level sensor, said gate setting sensing means and said gate actuator, for receiving said output signals from said water level sensor and said gate setting sensing means and for controlling said gate actuator to adjust the gate setting, and to thus adjust the rate of flow of water therethrough independently of fluctuations in the main channel, based on said output signals so as to enable a desired rate of flow of water therethrough to be maintained.

2. The automated turnout control system of claim 1 wherein said gate comprises a movable gate member movable to a plurality of flow control positions including a fully open position wherein maximum flow is provided and a fully closed position wherein flow is stopped.

3. The automated turnout of claim 2 wherein said gate setting sensing means comprises a position sensor for sensing the position of said movable gate member.

4. The automated turnout of claim 3 wherein said gate comprises a slide gate and said movable gate member comprises a vertically movable gate leaf.

5. The automated turnout of claim 4 wherein said gate actuator comprises a linear actuator for raising and lowering said gate leaf of said slide gate.

6. The automated turnout of claim 1 wherein said controller comprises a central processing unit.

7. The automated turnout of claim 6 wherein said central processing unit uses a proportional integral algorithm in controlling said gate actuator.

8. The automated turnout of claim 7 wherein said central processing unit uses a closed loop control algorithm.

9. The automated turnout of claim 1 wherein the flow measurement structure is located downstream of said flow control gate.

10. The automated turnout of claim 9 wherein said water level sensor is located upstream of said flow measurement structure and downstream of said adjustable flow control gate.

11. The automated turnout of claim 1 wherein said water level sensor comprises an ultrasonic sensor and said flow measurement structure comprises a weir or flume.

12. The automated turnout of claim 1 wherein the flow measurement structure comprises a stilling well and said water level sensor comprises a stilling well mounted string transducer.

* * * * *